(12) United States Patent
Volfson

(10) Patent No.: US 9,909,840 B2
(45) Date of Patent: *Mar. 6, 2018

(54) NETWORKED ANEMOMETER SYSTEM FOR WINDMEASUREMENT

(71) Applicant: Leo Volfson, San Diego, CA (US)

(72) Inventor: Leo Volfson, San Diego, CA (US)

(73) Assignee: Torrey Pines Logic, Inc., San Diego, CA (US)

(*) Notice: Subject to any disclaimer, the term of this patent is extended or adjusted under 35 U.S.C. 154(b) by 1215 days.

This patent is subject to a terminal disclaimer.

(21) Appl. No.: 13/870,859

(22) Filed: Apr. 25, 2013

(65) Prior Publication Data

US 2014/0324348 A1 Oct. 30, 2014

(51) Int. Cl.
*G01D 21/00* (2006.01)
*F41G 3/08* (2006.01)
*G01W 1/02* (2006.01)
*G01S 19/13* (2010.01)
*G01W 1/06* (2006.01)

(52) U.S. Cl.
CPC .............. *F41G 3/08* (2013.01); *G01S 19/13* (2013.01); *G01W 1/02* (2013.01); *G01W 1/06* (2013.01)

(58) Field of Classification Search
USPC .............................. 702/3; 235/404; 340/601
See application file for complete search history.

(56) References Cited

U.S. PATENT DOCUMENTS

2014/0110482 A1* 4/2014 Bay .................... F41G 1/38 235/404

* cited by examiner

*Primary Examiner* — Lam Nguyen
(74) *Attorney, Agent, or Firm* — Fish & Richardson P.C.

(57) ABSTRACT

The present disclosure describes structures, methods, and functionality for measuring a wind profile with networked anemometers. One method includes receiving real-time wind measurement data from each of one or more anemometer sensor platforms (ASPs) in a network, receiving atmospheric data, and calculating, using the received real-time wind measurement data and the received atmospheric data, at least one of real-time wind measurements, a wind profile, an average wind speed, or a weapon aiming offset.

18 Claims, 14 Drawing Sheets

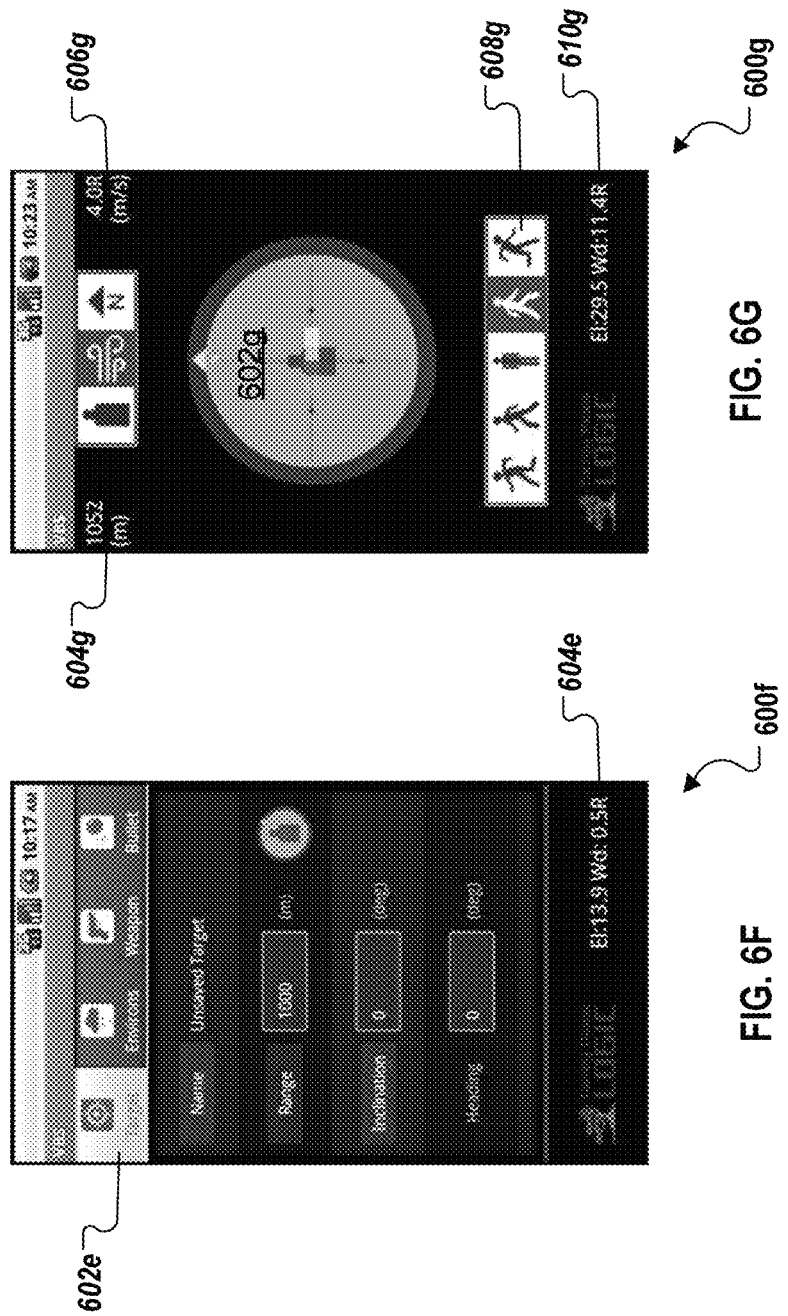

NETWORKED ANEMOMETER SYSTEM FOR WINDMEASUREMENT

This Application is related to U.S. patent application Ser. No. 13/870,828, filed on Apr. 25, 2013. The entire contents of U.S. patent application Ser. No. 13,870,828 are hereby incorporated by reference.

BACKGROUND

Wind can be unpredictable and influence, among other things, the behavior, performance, and movement of objects. Wind measurements are often estimated for a particular location by manual, visual observations. Estimation accuracy can be dependent upon observer training, experience, skill, available observation equipment, atmospheric conditions, and observational range. At higher observational ranges, manual observations become more error prone. To accurately determine cumulative wind effects, a single measurement point is not sufficient and reliance upon a single measurement can introduce unacceptable error into calculations for mitigating wind effects for longer-range-dependent activities.

SUMMARY

The present disclosure relates to methods and systems for measuring wind with networked anemometers. One method includes receiving real-time wind measurement data from each of one or more anemometer sensor platforms (ASPs) in a network, receiving atmospheric data, and calculating, using the received real-time wind measurement data and the received atmospheric data, at least one of real-time wind measurements, a wind profile, an average wind speed, or a weapon aiming offset.

Other implementations of this aspect include corresponding systems configured to perform the actions of the method. One or more systems can be configured to perform particular actions of the method. The systems can include one or more computers configured to perform the particular operations or actions by virtue of having software, firmware, hardware, computer-readable media or a combination of software, firmware, hardware, or computer-readable media installed on the systems. One or more computer programs can be configured to perform particular operations or actions by virtue of including instructions that, when executed by a computer, cause the computer to perform the actions.

The foregoing and other implementations can each optionally include one or more of the following features, alone or in combination:

A first aspect, combinable with the general implementation, wherein the atmospheric data is received in real time from an external source.

A second aspect, combinable with any of the previous aspects, further comprising: receiving at least one of weapon, projectile, or target data; calculating, by operation of a computer and using the received real-time wind measurement data, the received atmospheric data, and at least one of the received weapon, projectile, or target data, a ballistic solution for a projectile; and calculating, by operation of the computer and using the calculated ballistic solution, a weapon aiming offset.

A third aspect, combinable with any of the previous aspects, further comprising providing a replay functionality of at least one of logged received real-time wind measurement data or user actions.

A fourth aspect, combinable with any of the previous aspects, further comprising initiating a display of the calculated weapon aiming offset in a graphical user interface.

A fifth aspect, combinable with any of the previous aspects, further comprising receiving at least one of microphone, camera, or global positioning device data from an ASP.

The subject matter described in this specification can be implemented in particular implementations so as to realize one or more of the following advantages. First, a networkable anemometer sensor platform (ASP) provides multiple atmospheric and/or geographic sensors in a self-configurable, weather proof, portable, and easily deployable package. Second, each ASP can be networked with other ASP units or suitable weather/atmospheric data systems and a base station in a networked anemometer system (NAS) to enhance completeness and accuracy of wind profile calculations and to provide ballistic solutions and related data and/or functions for various applications. Third, multiple, real-time atmospheric- and/or geographic-based measurements can be made simultaneously and at ranges beyond accurate manual observation and/or estimation capabilities. The measurement data can then be transmitted as input to a high-performance software suite providing various measurement-data-related calculations and functions. Fourth, a wind profile can be calculated as a weighted average of measured wind components along an entire measurement path providing complete path coverage. Fifth, accurate wind profile calculations and/or offsets can be made accurately and consistently day or night and in different weather and atmospheric conditions. Sixth, due to provided real-time, high-accuracy offset calculations, when in use in a combat zone, concealment/safety of a weapon operator and/or assistant target spotter can be enhanced by maximizing engagement ranges from weapon to target and minimizing weapon operator, assistant target spotter and/or weapon movements necessary to adjust a projectile point-of-aim to impact a desired target. Seventh, training of weapon operators and/or assistant target spotters is enhanced by providing real-time feedback and/or correction of manual, visual crosswind speed observations/estimations and offset calculations for various target ranges. Eighth, a NAS can provide calculated wind profile data useful for maximizing efficiency of, for example, a wind turbine farm, pesticide dispersal, and irrigation. Other similar applications can include tracking/dispersal analysis of pollen and other airborne particulates, radiation, insects, and the like. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 6A is an example screenshot of a ballistic solver application (BSA) user interface according to an implementation.

FIG. 6B is an example screenshot of an advanced bullet properties data entry dialog user interface for the BSA according to an implementation.

FIGS. 6F-6G are example screenshots of mobile device user interfaces for the BSA according to an implementation.

Like reference numbers and designations in the various drawings indicate like elements.

DETAILED DESCRIPTION

This disclosure generally describes methods and systems for measuring wind with networked anemometers.

The following description is presented to enable any person skilled in the art to make and use the invention, and is provided in the context of a particular application and its requirements. By measuring wind components at different ranges from an origin, using networked anemometers, a cumulative wind profile can be calculated. The calculated cumulative wind profile can be used in various applications to mitigate (or "offset") one or more effects of measured wind components. For example, to offset range wind and/or crosswind effects on a projectile, one or more aiming/sighting offset values can be calculated using the cumulative calculated wind profile. Various modifications to the disclosed implementations will be readily apparent to those skilled in the art, and the general principles defined herein may be applied to other embodiments and applications without departing from scope of the disclosure. Thus, the present disclosure is not intended to be limited to the described and/or illustrated implementations, but is to be accorded the widest scope consistent with the principles and features disclosed herein.

Figure 1:
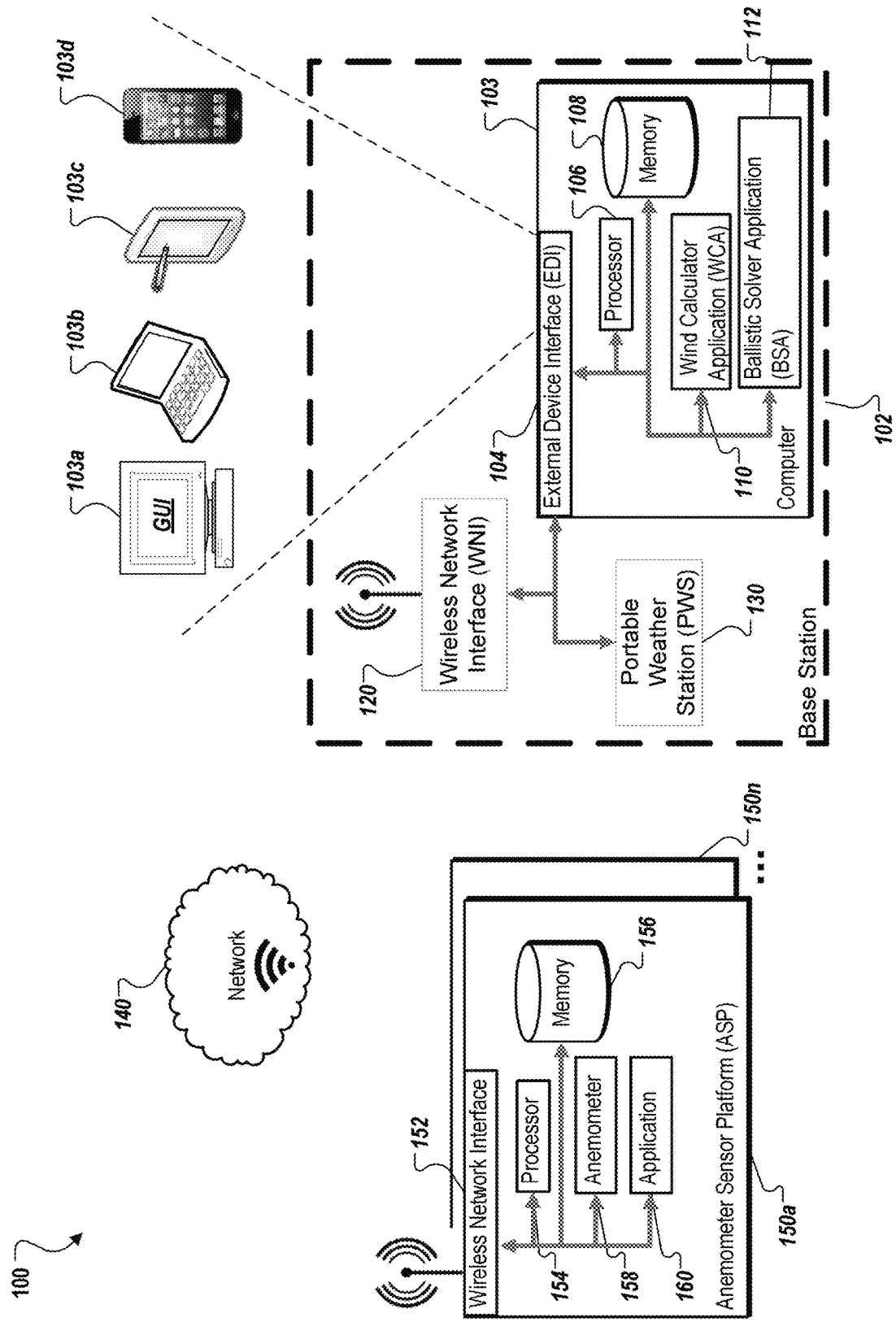
FIG. 1 is a block diagram illustrating components of a networked anemometer system (NAS) for measuring wind according to an implementation.

FIG. 1 is a block diagram illustrating components of a networked anemometer system (NAS) 100 for measuring wind according to an implementation. The illustrated NAS 100 includes or is communicably coupled with a base station 102 and one or more anemometer sensor platforms (ASPs) 150 that communicate across a network 140.

At a high-level, the base station 102 is an electronic computing device operable to receive, transmit, process, store, or manage data and information associated with the example distributed computing system 100. According to some implementations, the base station 102 may also include or be communicably coupled with an e-mail server, a web server, a caching server, a streaming data server, and/or other suitable server. The following described computer-implemented methods, computer-readable media, computer systems, and components of the NAS 100 provide functionality through one or more graphical user interfaces (GUIs) providing an efficient and user-friendly presentation of data provided by or communicated within the NAS 100.

The base station 102 includes a computer 103, a wireless network interface 120, and/or a portable weather station 130.

At a high-level, the computer 103 stores and/or executes one or more wind calculator applications 110 and uses atmospheric and/or other data supplied by the portable weather station 130, one or more ASP 150 units, and/or other suitable data sources (not illustrated) communicably coupled to the NAS 100. For example, the other suitable data sources may include data from another base station 102, ground- and/or space-based weather/atmospheric data, mobile weather station data, weather radar data, manually entered data entry, and the like. The computer 103 (illustrated as one or more of example computers 103a-103d) is intended to encompass any computing device such as a desktop computer, laptop/notebook computer, smart phone, personal data assistant (PDA), tablet computing device, one or more processors within these devices, or any other suitable processing device. The computer 103 may include an input device, such as a keypad, touch screen, or other device that can accept user information, and an output device that conveys information associated with the operation of the computer 103 itself, the base station 102, the network 140, and/or the one or more ASP 150 units, including digital data, visual and/or audio information, or a GUI. In some implementations, the computer 103 is a ruggedized, laptop-type computer 103. In some implementations, the computer 103 includes an external device interface 104, a processor 105, a memory 106, and a wind calculator application 110.

The external device interface (EDI) 104 permits communicably coupling computing devices, such as the wireless network interface 120, the portable weather station 130, and/or other suitable device to the computer 103, including, for example, a rifle scope, a spotting scope, a display, a recording device such as a computer or server to capture data from one or more components of the NAS 100. Generally, the EDI 104 comprises logic encoded in software and/or hardware in a suitable combination and operable to communicate with attached computing devices. More specifically, the EDI 104 may include software and/or hardware supporting one or more communication protocols associated with communications such that the EDI 140 hardware is operable to communicate physical signals between the computer 103 and another computing device. For example, the external device interface 103 could provide universal serial bus (USB), FIREWIRE, LIGHTNING, RS-232, BLUETOOTH, WiFi, wireless, cellular and/or other suitable interface type connectivity to the computer 103. In some instances, the EDI 104 can also provide adaptors to switch between interface types. Although illustrated as a single EDI 104, two or more EDIs 104 may be used according to particular needs, desires, or particular implementations of the NAS 100.

Generally, the processor 106 executes instructions and manipulates data to perform the operations of the computer 103 and/or the base station 102. Specifically, the processor 106 executes instructions required to provide calculations and associated functionality for measuring wind with networked anemometers. Although illustrated as a single processor 106, two or more processors 106 may be used according to particular needs, desires, or particular implementations of the computer 103 and/or the NAS 100.

The computer 103 also includes a memory 108 that holds data for the base station 102, computer 103, and/or other components of the NAS 100. Although illustrated as a single memory 108, two or more memories may be used according to particular needs, desires, or particular implementations of the computer 102, base station 103, and/or other components of the NAS 100. While memory 108 is illustrated as an integral component of the computer 103, in alternative implementations, memory 108 can be wholly or partially external to the computer 103 and/or the NAS 100. In some implementations, the memory 108 includes one or more instances of user profile data, logs, ASP 150 unit profiles, policies, conditions, parameters, variables, algorithms, instructions, constraints, references, and/or any other suitable data consistent with this disclosure used to provide a networked anemometer system for measuring wind.

The wind calculator application (WCA) 110 is a software application that performs at least wind profile calculations based on weather/atmospheric data retrieved from one or more ASP 150 units and/or the portable weather station 130. For NAS 100 applications involving calculation of ballistics for a projectile, the core projectile ballistic calculation functionality of the WCA 110 software is provided by a ballistics solver application (BSA) 112. In some NAS 100 implementations, the BSA 112 functionality is not available. In other implementations, the BSA 112 functionality can be disabled. Refer to FIGS. 5 and 6A-6G and associated descriptions below for additional detail regarding features and/or functionality related to the WCA 110 and BSA 112.

In some implementations, the WCA 110 can include a web browser. In some implementations, the WCA 110 can use parameters, metadata, and other information received at launch to access a particular set of data from the computer 103 and/or other components of the NAS 100. Once WCA 110 is launched, a user may interactively process a task, event, or other information associated with the base station 102, computer 103, and/or the NAS 100. Further, although illustrated as a WCA 110, the WCA 110 may be implemented as multiple applications/modules, each application/module providing particular functionality. In some implementations, the WCA 110 may act as a GUI interface for one or more other components of the NAS 100 in providing a networked anemometer system for wind measurement. For example, a request to ignore data from one or more ASP 150 units may be initiated by deselecting a networked ASP 150 unit on the WCA 110 GUI interface. The de-selection action can also send a request to the ASP 150 unit to place itself into a standby mode to save battery power. The WCA 110 GUI interface could then indicate that that deselected ASP 150 unit has responded to the de-selection request with a status message that it has gone into standby and is awaiting further instructions. In some implementations, the WCA 110 and/or BSA 112 can provide data for applications executing on other computing devices, such as smartphones, tablet computers, laptop computers, or other suitable types of computing devices.

As previously stated, for NAS 100 applications involving calculation of ballistics for a projectile, the BSA 112 computes a cumulative wind influence on a projectile achieving six degrees-of-freedom using a three degree-of-freedom modified point mass numerical solver that considers velocity, time of flight, and bullet drop as a function of the projectile's position downrange until the projectile reaches the target taking into account current environmental conditions. The BSA 112 fully accounts for Coriolis effects in both vertical and horizontal directions-of-fire, spin drift, and aerodynamic jump (the Magnus effect). The BSA 112 contains all standard drag curves (G1, G7, etc.) and the ability to input/create custom drag curves for custom/designer projectiles. Refer to FIGS. 6F-6G and associated descriptions below for additional information related to the WCA 110 and BSA 112.

In some implementations, a BSA device can be coupled with and/or integrated into an ASP 150 unit. In this implementation, the ASP 150 can measure, for example planar X-Y axis wind components near the ground while the BSA device can be adapted to analyze a Z axis to provide three-dimensional data regarding crosswind speeds. In some implementations, ASP 150 units can also determine and provide wind updraft data.

Generally, the wireless network interface (WNI) 120 comprises logic encoded in software and/or hardware in a suitable combination and operable to communicate with the network 140. More specifically, the WNI 120 may comprise software supporting one or more communication protocols associated with communications such that the network 140 and/or the WNI 120 hardware is operable to communicate physical signals within and outside of the NAS 100. The WNI 120 permits the computer 103 to receive/send data from/to the network 140. For example, using the WNI 120, the computer 103 can receive data that has been transmitted wirelessly from multiple ASP 150 units. In another example, the WCA 110 or other application (not illustrated) can use the WNI 120 to instruct ASP 150 units to configure a built in sensor package to change its data sampling rate. Although illustrated as a single WNI 120, two or more WNIs 102 may be used according to particular needs, desires, or particular implementations of the base station 102, computer 103, and/or the NAS 100. In some implementations, the WNI 120 can also support wired network connections. While the network 140 is illustrated as a wireless network, in some implementations, network 140 can be a wired network or a combination wireless/wired network.

The computer 103 can also receive data from/send data to one or more external computing devices attached to the EDI 104. In some instances, the attached computing devices can include storage media and/or other computers of a similar or different type than computer 103 (neither illustrated). For example, the portable weather station (PWS) 130 can be communicatively coupled to the computer 103 using a USB connection or other suitable connection provided by the EDI 104. In some instances the PWS 130 can be used to provide data such as temperature, pressure, and humidity used for projectile ballistics computations. In some instances, the data provided by a PWS 130 can be gathered at one or more ASP 150 units to be manually input into the base station 102 computer 103.

The anemometer sensor platform (ASP) 150 provides wind readings and/or other atmospheric/weather-related data that are transmitted to the base station 102. The ASP 150 includes a wireless network interface 152, processor 154, memory 156, anemometer 158, and/or application 160. The wireless network interface (WNI) 152 may operate similarly to the above-described WNI 120 of the base station 102 but also performing functions specifically associated with the purposes of the ASP 150, including communicating with other ASP 150 units and/or suitable data sources. In some implementations, the WNI 152 can also support wired network connections. The processor 154 may operate similarly to the above-described processor 106 of the base station 102. Specifically, the processor 154 executes instructions, for example application 160, and manipulates data to perform the operations associated with the ASP 150, including the functionality required to send data to the base station 102. The processor 154 can also perform operations required to receive, process, and/or respond to requests from the base station 102. The memory 156 typically stores objects and/or data associated with the purposes of the ASP 150 but may also serve as storage for one or more components of the NAS 100, including other ASP 150 units.

The anemometer 158 measures wind components and transmits wind measurement data through the WNI 152 to other ASP 150 units and/or the base station 102. In some implementations, the anemometer 158 is an ultrasonic anemometer. The anemometer 158 reports at least two components of wind: 1) range wind—a horizontal component of true wind in the vertical plane through the line of fire of a projectile weapon and 2) crosswind—wind blowing at right angles to a given direction. An anemometer 158 must be properly oriented along an axis of measurement to properly measure range wind and crosswind components of wind in relation to a particular point. For example, to accurately measure a crosswind component of a wind on a weapon firing range, each ASP 150 unit anemometer 158 must be properly aligned to point along a projectile path, for example toward the firing line of a weapon. As another example, for an application measuring a wind profile for a wind turbine farm, each of a defined network group of ASP 150 anemometers should, in some implementations, be properly aligned to point toward the wind turbines of the wind turbine farm to ensure consistent measurement of the wind components. In some implementations, the anemometer 158 hardware module is marked with an anemometer alignment indicator indicating the proper side of the hardware module to orient toward a firing line (see FIG. 3 and associated description for additional detail).

The application 160 controls the basic operations of the ASP 150, including diagnostics, configuration, sensor integration, sensor orientation/configuration, data collection/transmission, receiving/responding to base station 102 requests, and the like. In some implementations, the application 160 can also provide automated, self-configuration functions. For example, when an ASP 150 is powered on, the application 160 may operate to instruct the WNI 152 to seek out other ASP 150 units, atmospheric/weather-related data sources, and/or a base station 102. If a base station 102 is found, the ASP 150 application 160 can request configuration data, permission to join an associated local ASP 150 network, and the like. If another ASP 150 is found, the application can identify itself to the other ASP 150 and request its associated base station 102 details (if available), local ASP 150 network details and configuration settings, peer ASP 150 units, and other similar data. In this manner, an ASP 150 beyond communication range with a base station 102 can use one or more other ASP 150 units as a relay to establish a connection with the base station 102. In some implementations, each ASP 150 unit and/or the application 160 can use an integrated/communicatively coupled global positioning system (GPS) and/or digital compass associated with each ASP 150 unit to determine its geographic location with respect to a base station and other ASP 150 units. The GPS and/or digital compass data can be used to determine an ASP 150 unit position, rank, and/or order within a network. Using these capabilities, an ASP 150 can be self-configuring and self-insertive (or "erecting") into an existing NAS 100. For example, one or more ASP 150 units can be deployed into an environment, configured to automatically run diagnostics and self-deploy (both mechanically and network-wise), and establish a network link with local ASP 150 peers. In some implementations, local ASP 150 peers can form a local ASP network for ASP-to-ASP communication and other functions. The ASP network can then seek and, if possible, establish a network communication with a base station 102. In some implementations, a base station 102 and/or an ASP network can permit a network connection only if particular security protocols, passwords, configurations, etc. are provided, configured, etc. In some implementations, an ASP-network can periodically seek a base station 102 and, if found, initiate connection procedures. For example, multiple ASP 150 units can be placed at a designated location and switched on. The multiple ASP 150 units would then create a local ASP network and seek a base station 102. If a base station is brought within communication range of the ASP-network, the ASP-network would attempt to connect with the base station. The connection may include, for example, a request for base-station 102 details, ASP configuration details, and the like. Once connect with the base station 102, the ASP-network can, for example, determine an ASP order based on the base station 102 geographic location and/or other data provided by the base station 102. Although illustrated as a single application 160, the application 160 can be implemented as multiple applications, each application providing particular ASP 150 functionality.

In other implementations, the ASP 150 can include other sensors providing additional atmospheric/weather-related or other data. For example, the ASP 150 could include a global positioning system (GPS) transmitter/receiver; altitude sensor; temperature, pressure, and humidity sensors; and the like (refer to description of FIG. for additional detail). In the instance where a temperature, pressure, and humidity sensor were included with one or more ASP 150 units in a NAS 100, the base station 102 could operate without a PWS 130.

Although the NAS 100 is illustrated and described in FIG. 1 as communicating using a wireless network, one or more components of the NAS 100 can be physically connected using a wired network or other suitable network infrastructure. In some implementations, indicated wireless components and interfaces can also support wired network connections. For example, a dedicated firing range may run network cabling to predetermined ASP 150 staging locations for network connectivity. In this instance, the WNI 152 on each ASP 150 unit and the WNI 120 on the base station 102 may not be used in a wireless mode or used in a wireless mode for backup communications in case a wired network connection fails.

Figure 2:
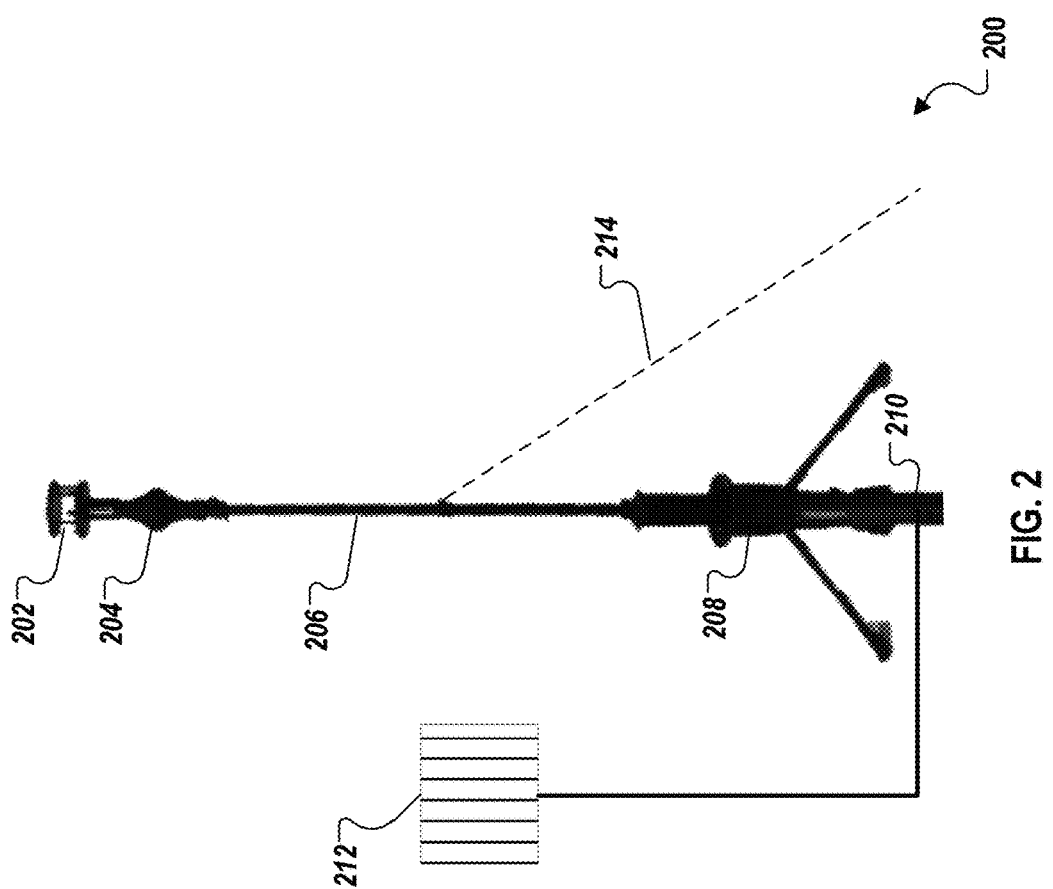
FIG. 2 illustrates an example anemometer sensor platform (ASP) unit according to an implementation.

FIG. 2 illustrates an example anemometer sensor platform (ASP) 150 unit according to an implementation 200. As illustrated, the ASP 150 includes an anemometer module 202 containing the anemometer 158, wireless network interface module 204 containing the WNI 152, telescopic mast 206, support stand 208, rechargeable battery 210, solar panel 212, and guy wire 214. Typically, the ASP 150 is weatherproof. The support stand 208 provides mobility to the ASP 150 unit and is typically in a tri-pod configuration with each leg independently configurable for length to stand level on a support surface, for example ground, concrete, sand, rock, or other support surface. Any suitable support stand 208 is envisioned as long as it provides stability for the physical ASP 150 in high winds and the capability to level the ASP unit on uneven ground. The battery 210 can be stand alone and/or connected to an external power supply (not illustrated), such as a fuel-powered generator and the like. In some implementations, the battery 210 can be connected to a solar panel 212. In this implementation, the solar panel 212 can provide effectively indefinite power/battery recharging to the ASP 150 in suitable light conditions. In some implementations, the solar panel 212 can be mounted on the ground, the support stand 208, the telescopic mast 206, and/or the anemometer module 202 as long is the solar panel 212 mounting location does not interfere with wind flow/measurements. In some implementations, the guy wire 214 can be used to further secure the ASP 150 against tipping over in high-speed wind conditions.

In some implementations, the support stand 208 can include the telescopic mast 206. In some implementations, the support stand 208 can be configured to provide an option to mount the ASP 150 to a fixed surface, such as a vertical or horizontal surface. The fixed surface can be, for example a fence, rail, post, pole, or wall. In some implementations, the support stand 208 legs may be fixed/closed and a bracket or other suitable mounting device coupled with the support stand 208 to attach the ASP 150 to the fixed surface. Other suitable mounting options are envisioned.

Other implementations of the ASP 150 can include one or more of visible/invisible lighting, de-icing components, gyroscope, inclinometer, digital compass, starlight/solar sensing/alignment components, audio microphones/speakers, video/still cameras, a rotatable telescopic mast 206, or electric motors/servo-mechanisms for automatic deployment/leveling and/or sensor movement/orientation.

Figure 3:
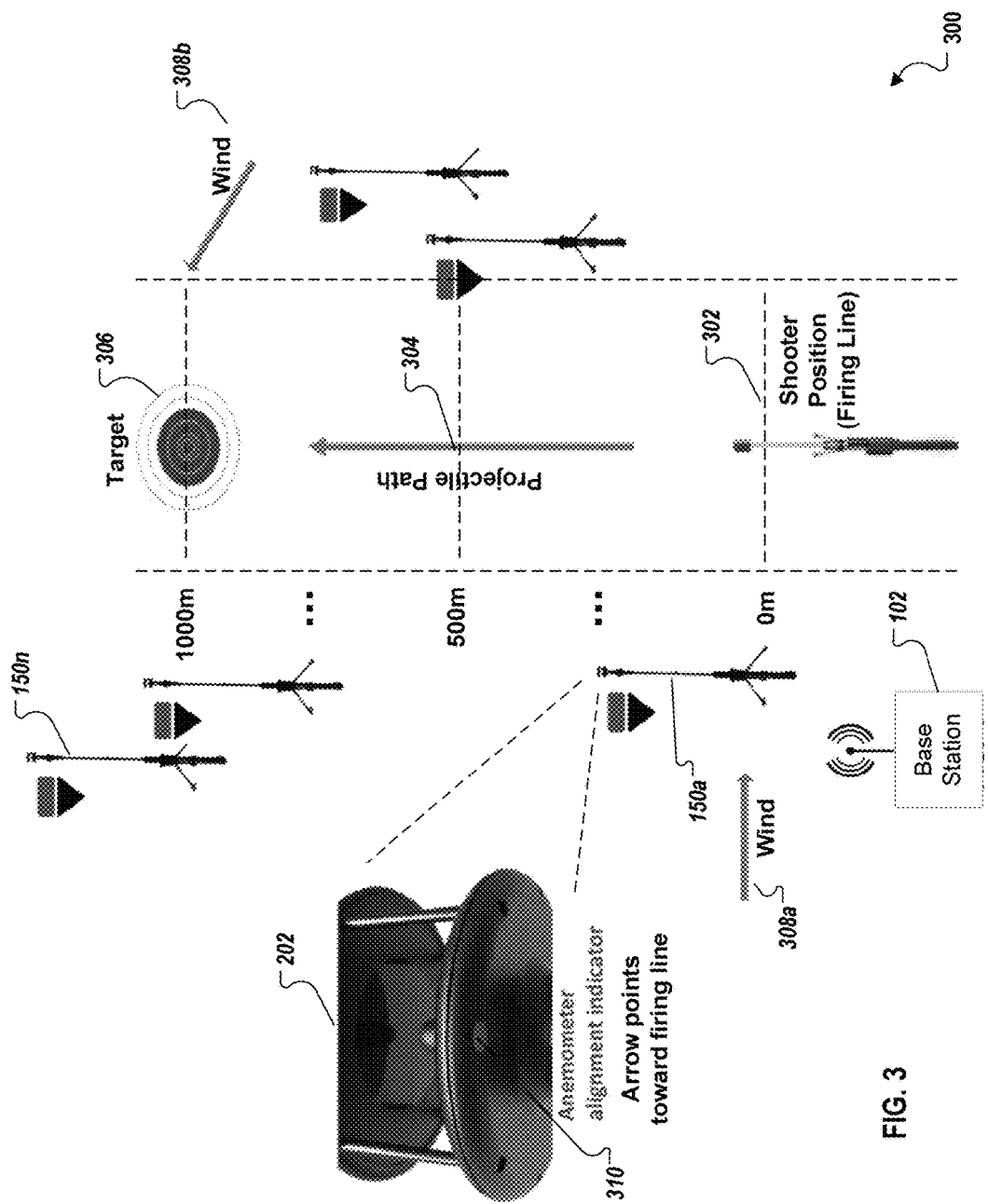
FIG. 3 illustrates proper ASP unit alignment for a weapon firing range NAS implementation.

FIG. 3 illustrates proper ASP 150 unit alignment for a weapon firing range NAS 100 implementation. When in flight, the trajectory of a projectile fired from a weapon into the atmosphere at an intended target is affected by ballistic factors including temperature, atmospheric pressure, humidity, air friction (drag), inclination angle, Coriolis drift due to latitude, air movement due to wind, and the like. Crosswinds move perpendicularly against the projectile's trajectory and push against the projectile; causing the projectile to deviate to a side from its current trajectory. Range winds act as a "tail" or "head" wind and can speed up or slow the projectile, respectively. At longer target ranges, wind effects on a projectile must be taken into account. As wind components may vary in speed and angle-of-influence at different points along the projectile's planned trajectory, compensating for wind effects normally requires estimations/measurements to be made at different ranges between the weapon and the intended target and an average wind profile to be calculated to properly account for cumulative wind effects on the projectile. Wind speeds are often estimated by manual, visual observations made by a weapon operator and/or an assistant target spotter and then an adjustment (a target offset) is made to a weapon point-of-aim using a weapon's sights and/or physical adjustment of the weapon's direction-of-aim in order to correct for estimated cumulative wind effects on a fired projectile. Manual observation accuracy is affected by training, experience, and/or skills of a weapon operator/spotter. Inaccurate observations/estimations can introduce unacceptable error into offset calculations and result in a projectile missing a target.

Illustrated ASP 150*a*-150*n* units are situated on both sides of an illustrated 1000 m firing range at regular spaced intervals. Note that in various implementations, ASP 150 units can be situated all to one side of a firing range (see FIG. 4). In some implementations, the ASP 150 units can also be irregularly spaced. As illustrated by anemometer module 202 and anemometer alignment indicator 310, the anemometer modules 202 of each ASP 150 unit are aligned using the anemometer alignment indicator 310 in the direction of and as close to a ninety degree angle to a shooter position (firing line) 302 as possible. This alignment allows the ASP 150 units to properly measure both range wind and crosswind components of winds 308*a*/308*b* along the entire firing range. Although illustrated as situated in close proximity to the firing line 302, base station 102 can be situated at any suitable position as long as within communication with at least one ASP 150 unit. In some implementations, the base station 102 can be remote to the firing range and coupled to one or more ASP 150 units using a network, such as the internet, radio communication, and the like.

In some implementations, each ASP 150 unit can contain a microphone and/or camera. The microphone can be used to, for example, indicate that a weapon has been fired, identify the fired weapon, locate the fired weapon, and/or track a fired projectile to identify which weapon fired the projectile. One or more audio signatures can be used to identify that a weapon has been fired and/or a type of weapon. Acoustic algorithms can be used to triangulate audio data received by one or more ASP 150 units to identify the location of the fired weapon. Other algorithms can use received audio and other data to track a fired projectile to a projected impact point. For example, ASP 150 units could be installed on the top of various buildings in a city. The ASP 150 units could then provide law enforcement instant feedback as to the location of a fired weapon and a projected projectile path. Other similar applications could include, for example, installation of ASP 150 units around military bases, in combat zones, and around protective zones.

In other implementations, a microphone could be coupled with a camera to provide, for example, audio and/or video surveillance, intrusion detection, and data for reactionary actions. An another example, if an ASP 150 microphone/camera detects intrusion within a designated security zone at night, an associated NAS 100 can be configured to alert security personal and possibly provide, among other things, GPS, compass, and crosswind data to an automated flare system to aim, account for any local wind effects, and fire a flare skyward at a position to illuminate a possible intruder. The NAS 100/ASP 150 could also, for example, activate ASP-integrated lights (visible and/or or invisible), banks of external lights, re-task a drone vehicle, provide possible intrusion coordinates to reactionary personnel, track a possible intrusion path, and/or the like.

Figure 4:
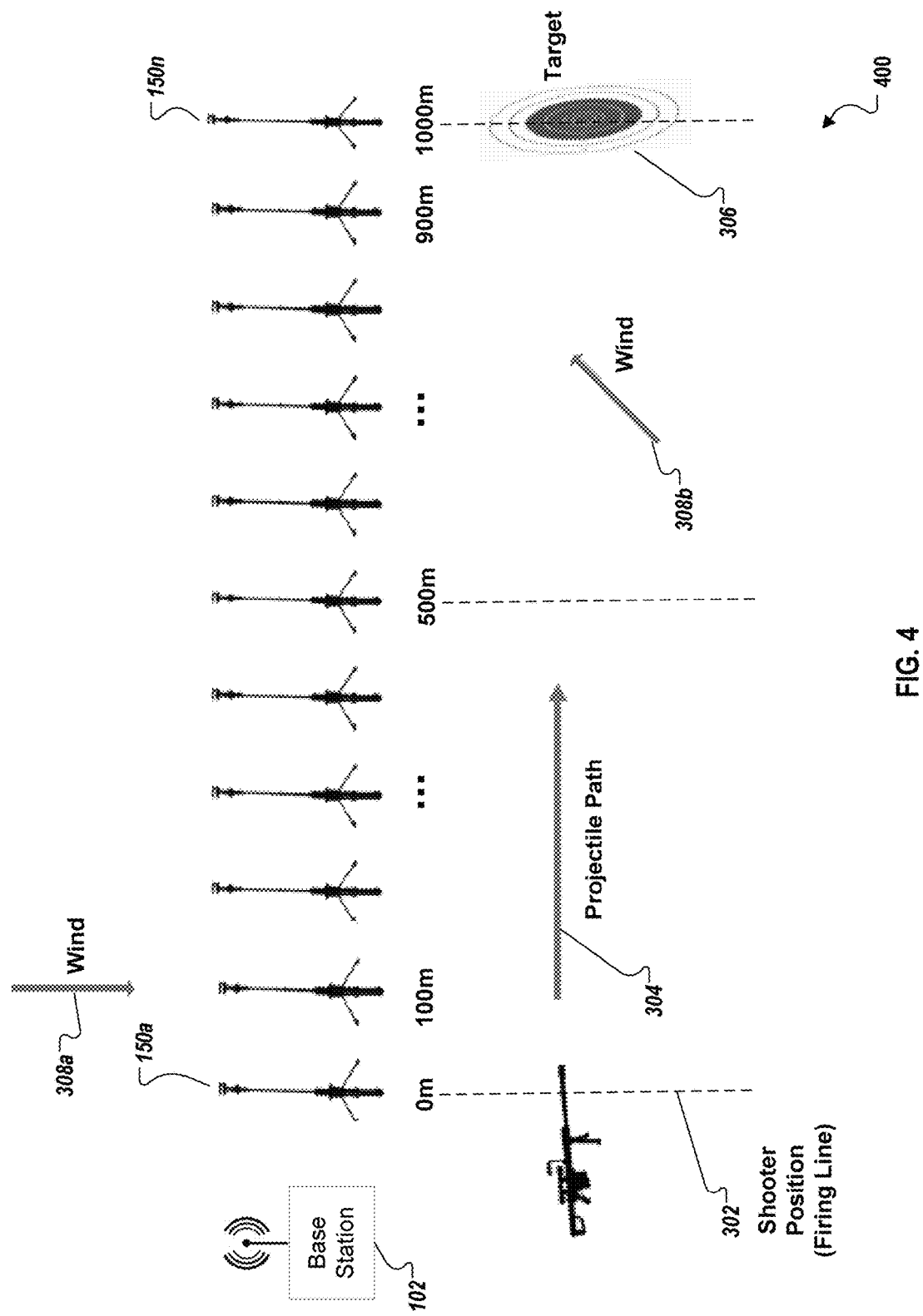
FIG. 4 illustrates an alternate example ASP arrangement for a weapon firing range NAS implementation.

FIG. 4 illustrates an alternate example ASP arrangement for a weapon firing range NAS 100 implementation. In this implementation, all the ASP 150 units are on one side of the firing range and oriented toward the firing line 302.

Figure 5:
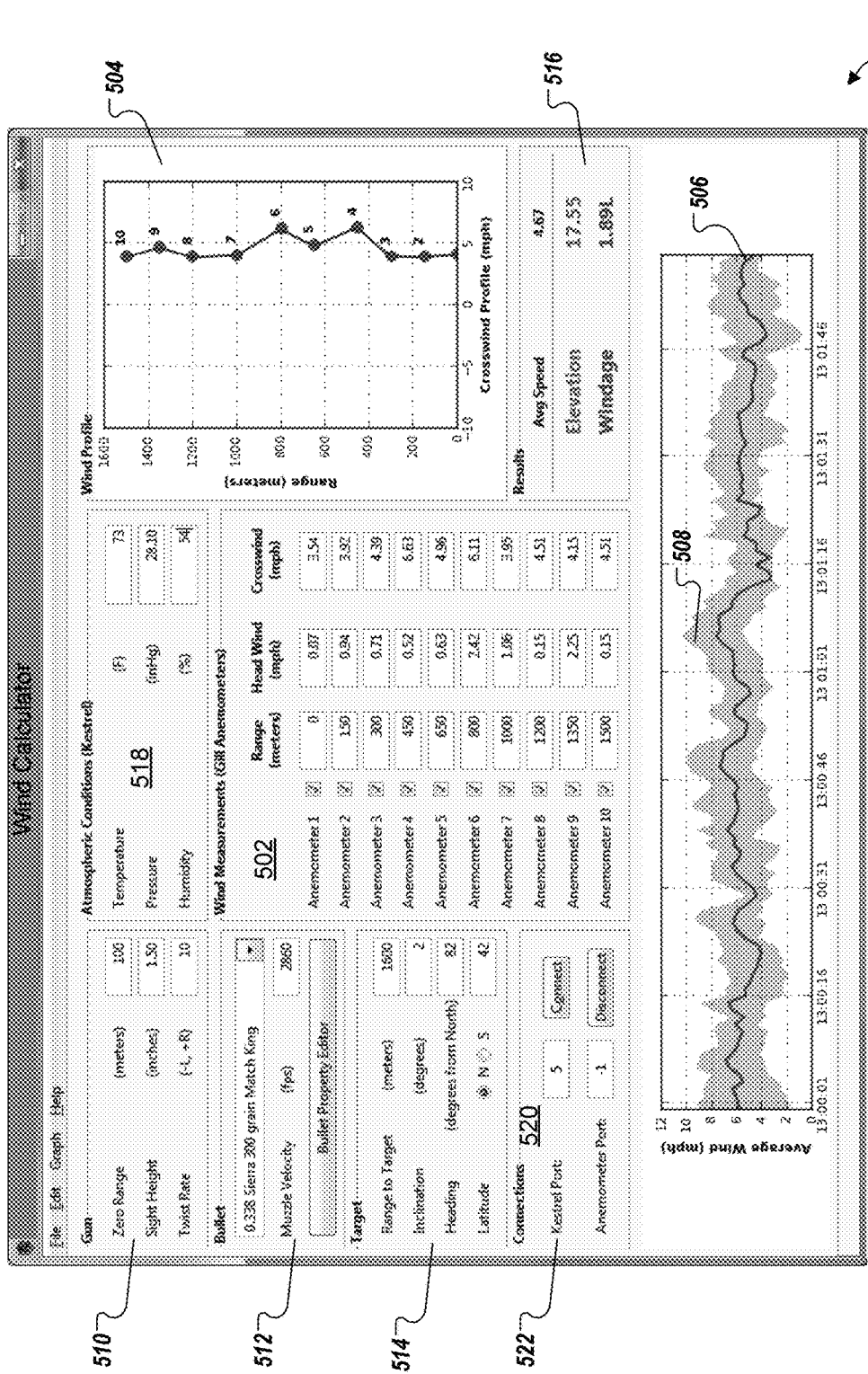
FIG. 5 is an example screenshot of a wind calculator application (WCA) user interface according to an implementation.

In some implementations, one or more ASP 150 units can be adapted to contain FIG. 5 is an example screenshot 500 of a wind calculator application (WCA) 110 user interface according to an implementation. As associated ASP 150 units associated with the NAS 100 are enabled, the software populates wind data from each ASP 150 at 502. For example, the wind data 502 includes the range of each ASP 150 unit, and both head wind (i.e., range wind) and crosswind wind component values measured. ASP 150 units may be deselected/selected to remove/add their values from the overall calculations performed. A real-time wind profile 504 with an average wind speed, here "4.67" mph, is also graphically presented.

The WCA 110 also tracks the average wind speed 506 over a selected time frame and displays it for user reference. For example, the WCA 110 has tracked the wind data 502 and generated the average wind speed 506 for approximately two minutes in the displayed graph. The maximum and minimum wind speed along the graph is also plotted as indicated by the wider band at 508.

The ballistic solver application 112 (described in more detail below) uses entered weapon 510 (e.g., zero range, sight height, and barrel twist rate), projectile 512 (e.g., bullet type, muzzle velocity, and possibly custom entered properties), and target 514 (e.g., range to target, inclination, heading, and latitude) data to produce a ballistic solution in conjunction with the wind data 502. For example, a user can enter a specific bullet type, here "0.338 Sierra 300 grain Match King" to compare how a determined offset calculation 516 for a specific weapon 510 and/or target 514 data is affected by data changes. In the example screenshot, the user is presented with an aiming elevation offset of 17.55 and windage setting of 1.89 to the left for the selected weapon 510 bullet type.

The WCA 110 also allows the entry of atmospheric conditions 518 (e.g., temperature, pressure, and humidity). In some implementations, atmospheric condition 518 data can be automatically supplied by the PWS 130. For example, PWS connections 520 specify connection port settings 522 for a KESTREL brand pocket weather station that may be connected by selecting the associated "Connect" GUI button.

In some implementations, the WCA 110 can be configured to continuously log received sensor data and/or user actions. This logged data can then be read back into the WCA 110 and "replayed." This capability provides users the ability to review sensor data and offset calculations as well as user actions for training purposes, security, and the like.

FIGS. 6A-6G illustrate example screenshots 600a-600g of a ballistic solver application (BSA) used for NAS 100 applications requiring the calculation of a ballistic solution for a projectile.

Figure 6A:
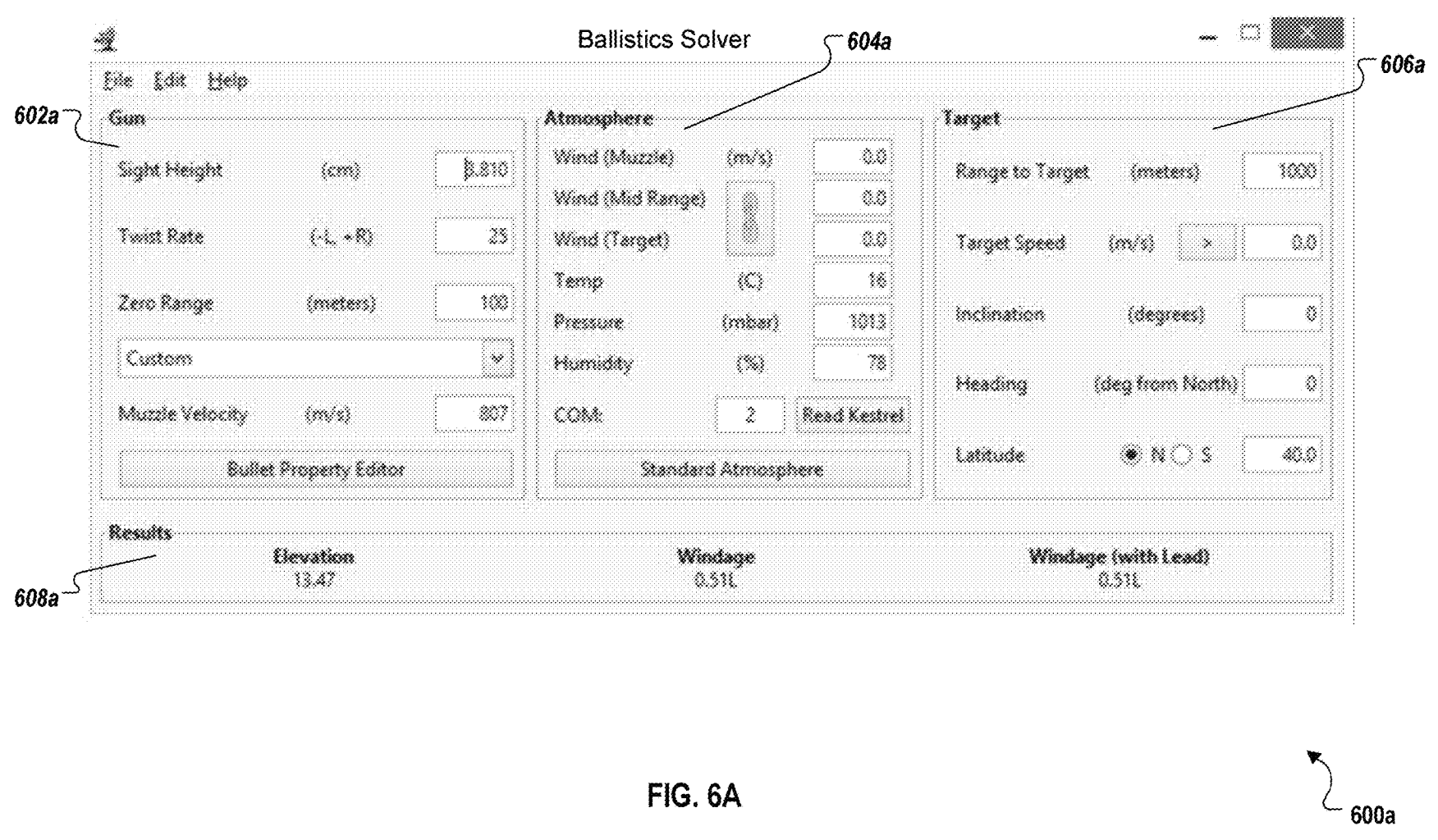

FIG. 6A is an example screenshot 600a of a ballistic solver application (BSA) 112 user interface according to an implementation. The BSA 112 is the ballistic solver/calculation software engine used by the WCA 110 to determine a ballistic solution for entered weapon/projectile 602a (e.g., sight height, barrel twist rate, zero range, custom bullet properties, and muzzle velocity), atmosphere 604a (e.g., wind at muzzle, wind at mid-range, wind at target, temperature, pressure, and humidity), and target 514 (e.g., range to target, target speed, inclination, heading, and latitude) information to produce the ballistic solution. For example, a user can enter custom projectile properties using a bullet property editor (described below) to compare how a determined offset calculation 608a for a specific weapon/projectile 602a, atmosphere 604a, and/or target 606a data is affected by data changes. In the example screenshot, the user is presented with an aiming elevation offset of 13.47 and windage setting of 0.51 to the left.

Figure 6B:
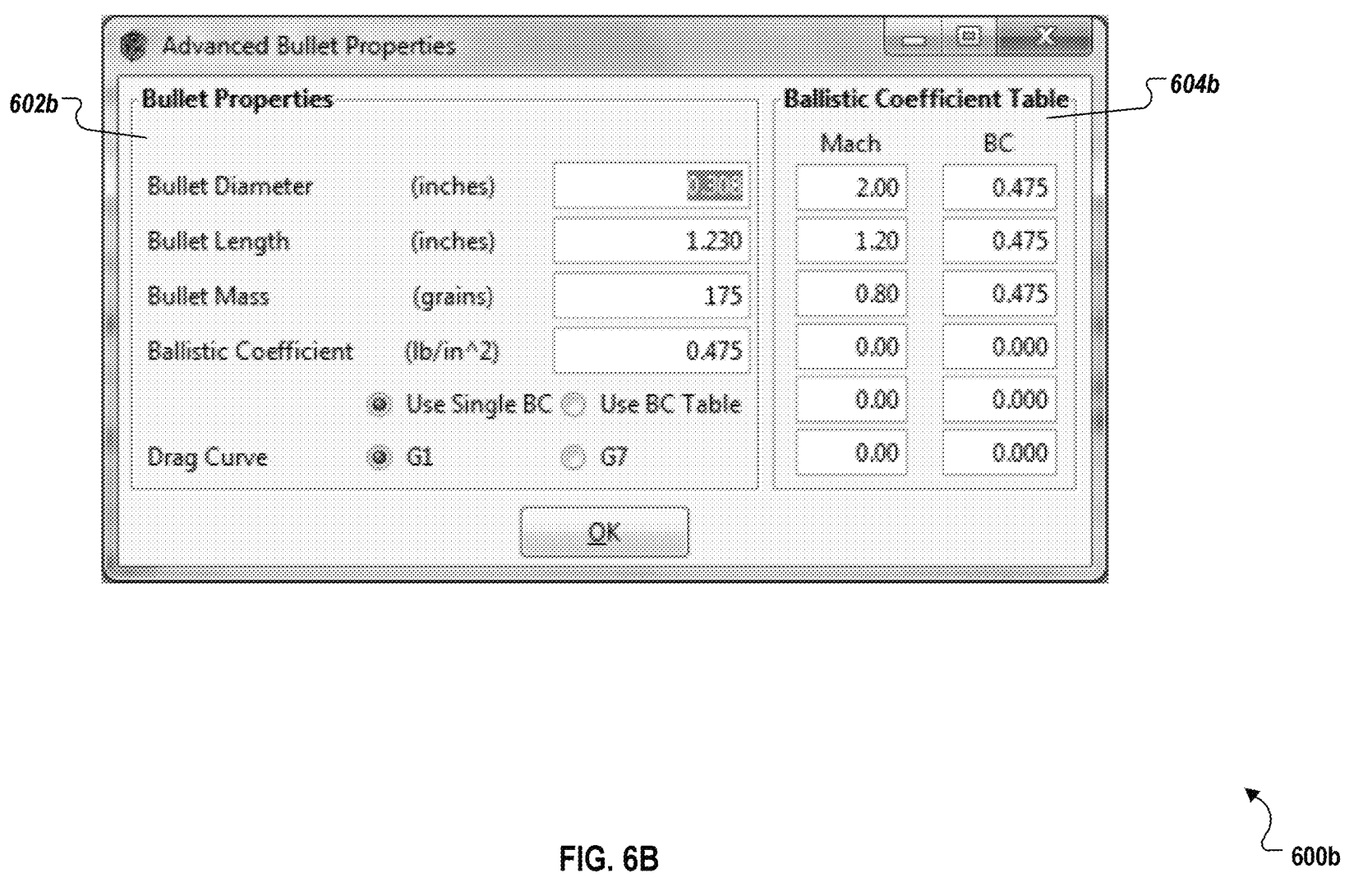

FIG. 6B is an example screenshot 600b of an advanced bullet properties data entry dialog user interface for the BSA 112 according to an implementation. A user can enter advanced bullet properties using the presented data entry fields that are factored into a ballistic solution provided by the BSA 112. For example, the user can select the "Bullet Property Editor" GUI button on the WCA 110 and/or BSA 112 application user interface to enter bullet properties 602b (e.g., bullet diameter, bullet length, bullet mass, ballistic coefficient, and drag curve type) and ballistic coefficient table 604b table values (e.g., Mach and ballistic coefficient (BC) values).

Figure 6C:
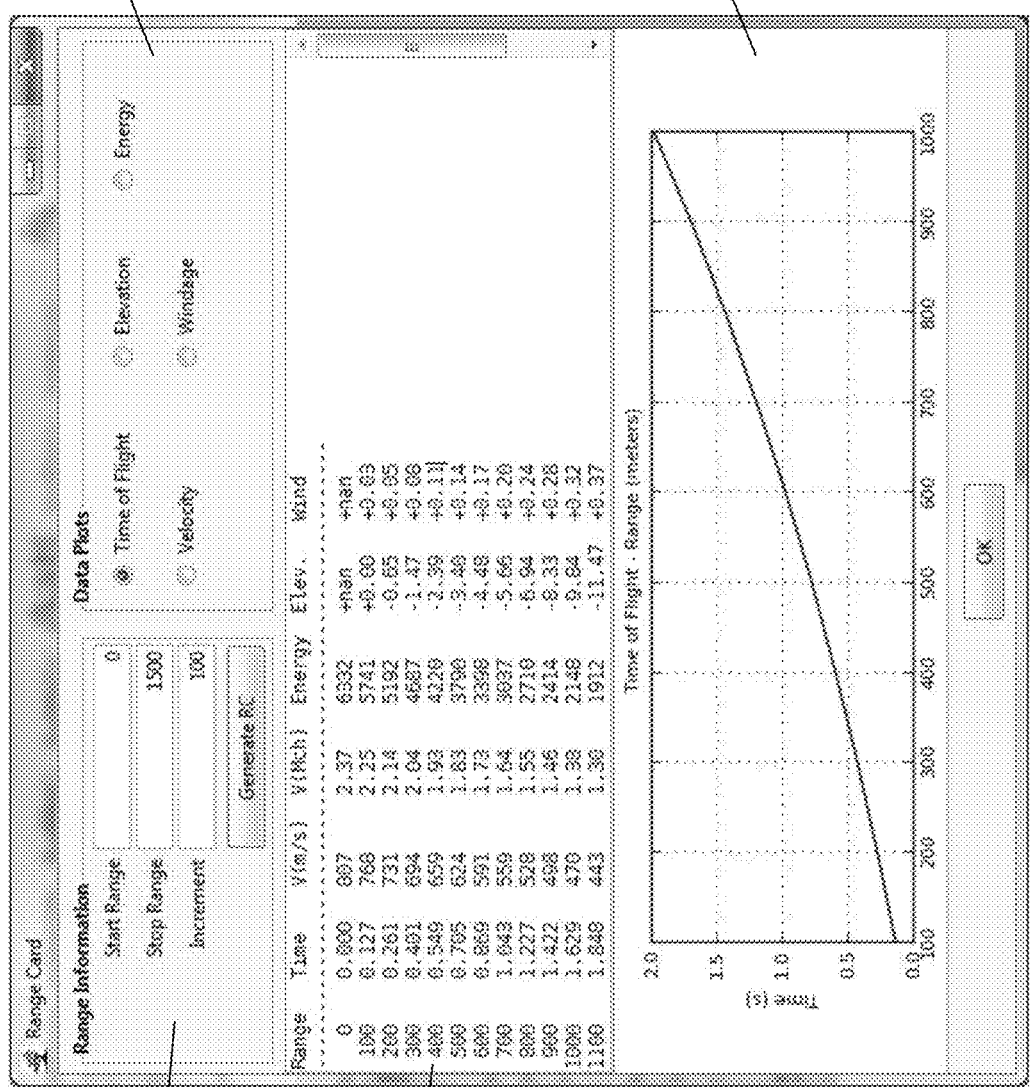
FIG. 6C is an example screenshot of a range card dialog user interface for the BSA according to an implementation.

FIG. 6C is an example screenshot 600c of a range card dialog user interface for the BSA 112 according to an implementation. In some implementations, a user can select to generate a range card from the WCA 110 and/or BSA 112 user interface menus. The generated range card 600c presents various types of selectable data plot options 602c (e.g., time of flight, elevation, energy, velocity, and windage) to generate graphical data plots 604c. In some implementations, the generated graphical data plots 604c can be overlaid for comparison purposes.) A user may enter specific range information 606c (e.g., start range, stop range, and increments) in order to generate range card data 608c for the user's reference. The range card 600c can be used for in-depth guidance of a weapon's effective range of operation for given operating conditions taking into account wind profile calculations and/or environmental data.

Figure 6D:
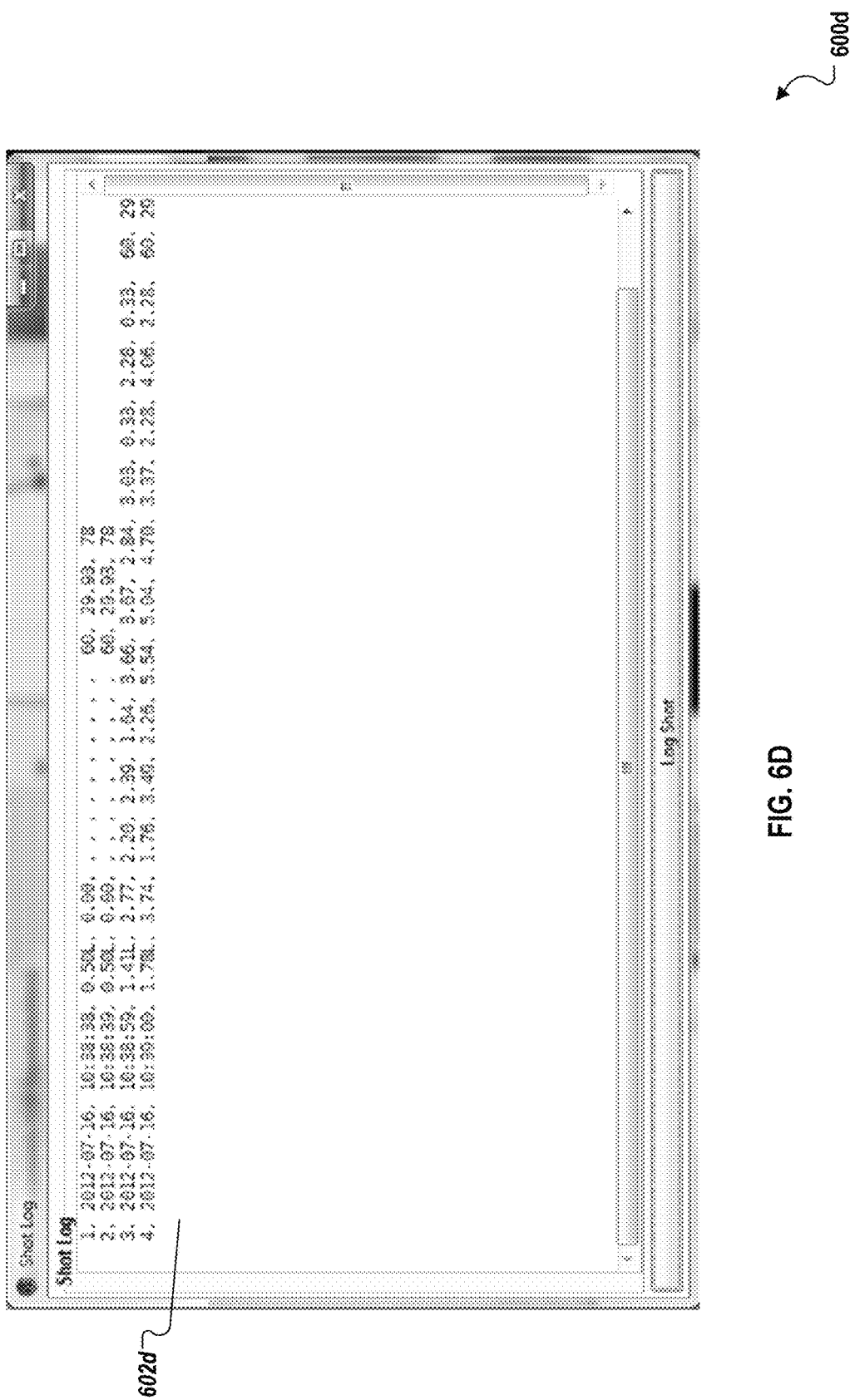
FIG. 6D is an example screenshot of a shot log dialog user interface for the BSA according to an implementation.

FIG. 6D is an example screenshot 600d of a shot log dialog user interface for the BSA 112 according to an implementation. In some implementations, a user can select to generate a shot log 602d from the WCA 110 and/or BSA 112 user interface menus. The generated shot log 602d records a captured data set of data and time, windage hold, readings from all reporting ASP 150 units, temperature, pressure, humidity, and the like for later analysis. The user can use the shot log to compare hit/miss results with the recorded data.

Figure 6E:
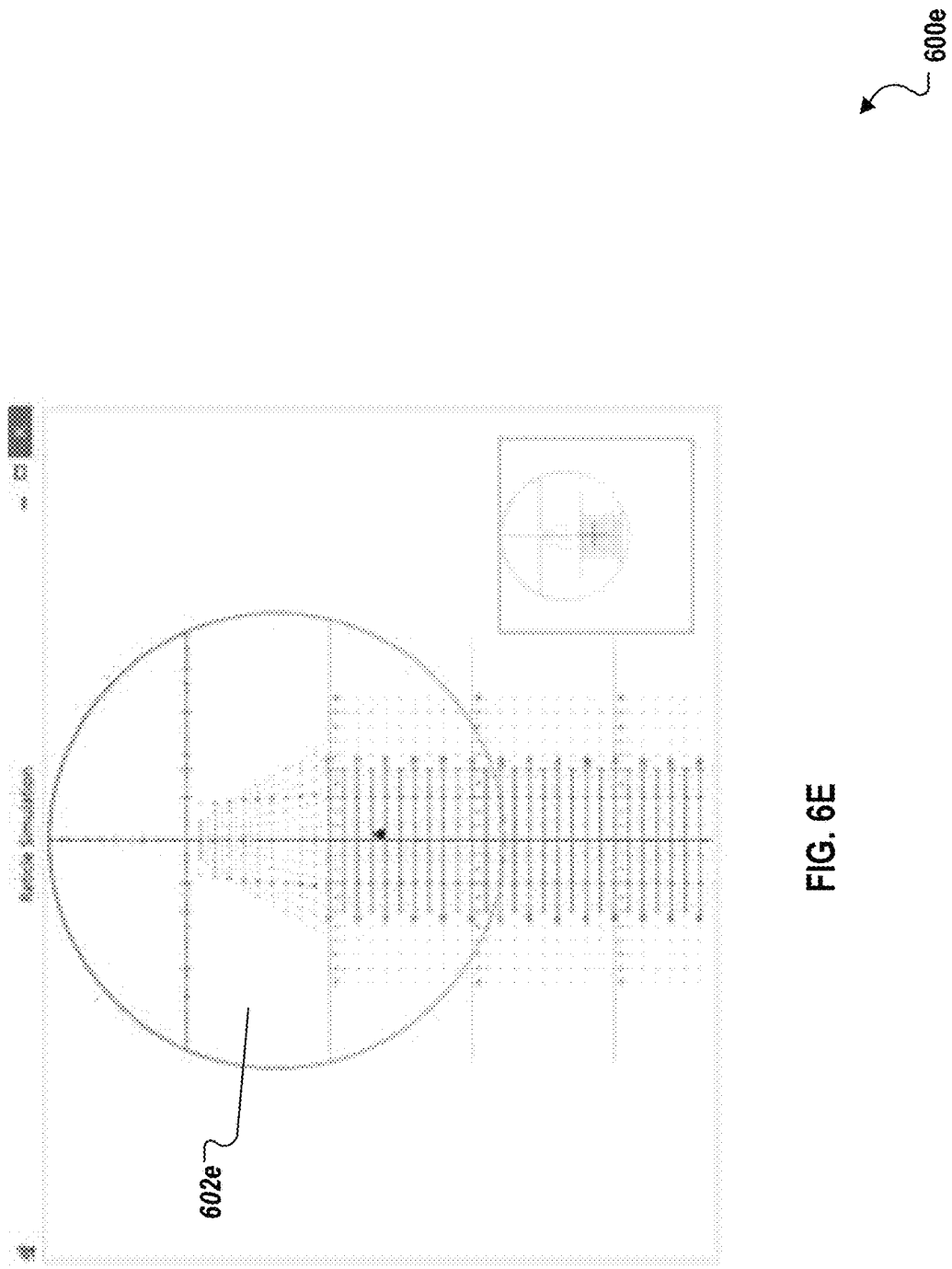
FIG. 6E is an example screenshot of a simulated reticle user interface for the BSA according to an implementation.

FIG. 6E is an example screenshot 600e of a simulated reticle user interface for the BSA 112 according to an implementation. In some implementations, a user can select to generate a simulated reticle 602e visually indicating how the user would use a real weapon sight reticle to match a presented offset calculation by either the WCA 110 and/or BSA 112. The BSA 112 can simulate various types of reticles, including fine crosshair, duplex crosshair, mil-dot, modern range finding, and any other suitable reticle type. The reticle simulations can be used for training purposes and to train users the proper use of various reticles for the same presented offset calculations.

FIGS. 6F-6G are an example screenshots 600f/600g of mobile device user interfaces for the BSA 112 according to an implementation. FIG. 6F illustrates an example screenshot 600f of target data entry fields 602f (e.g., name, range, inclination, and heading). As illustrated, the interface will also allow the entry of data related to environment, weapon, and bullet consistent with the data fields described above with respect to at least FIGS. 5 and 6A-6B. An offset calculation 604e for the entered data is also presented. In the example screenshot 600f, the user is presented with an aiming offset elevation of 13.39 and windage setting of 0.5 to the right.

FIG. 6G illustrates an example screenshot 600g of a simulated reticle user interface. As illustrated, the interface provides a reticle 602g, target distance 604g, wind direction and speed 606g, a quick determination target speed and direction indication 608g (e.g, here the target is indicated as moving to the right slowly), and offset calculation data 610g. In the example screenshot 600g, the user is presented with an aiming offset elevation of 29.5 and windage setting of 11.4 to the right.

Those of skill in the art will appreciate that each provided example GUI screenshot is only one of a multitude of possible GUI implementations depending on, for example, the use of various operating systems, computer hardware, display technologies, software standards, software protocols, and the like. The provided examples are meant to only illustrate possible GUI interfaces consistent with this disclosure and are not meant to be limiting in any way.

Figure 7A:
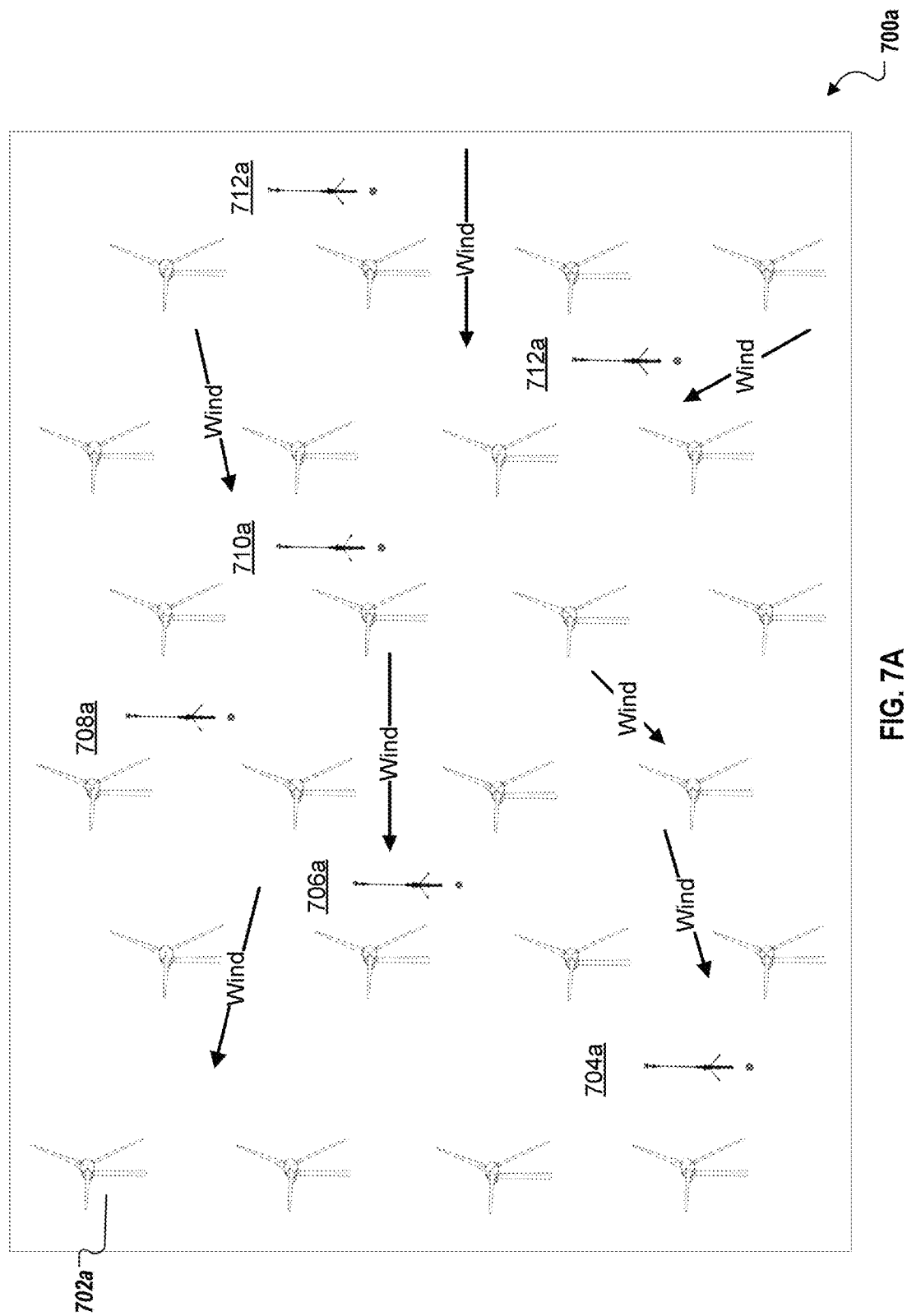
FIGS. 7A-7B illustrate additional applications of NAS technology.
Figure 7B:
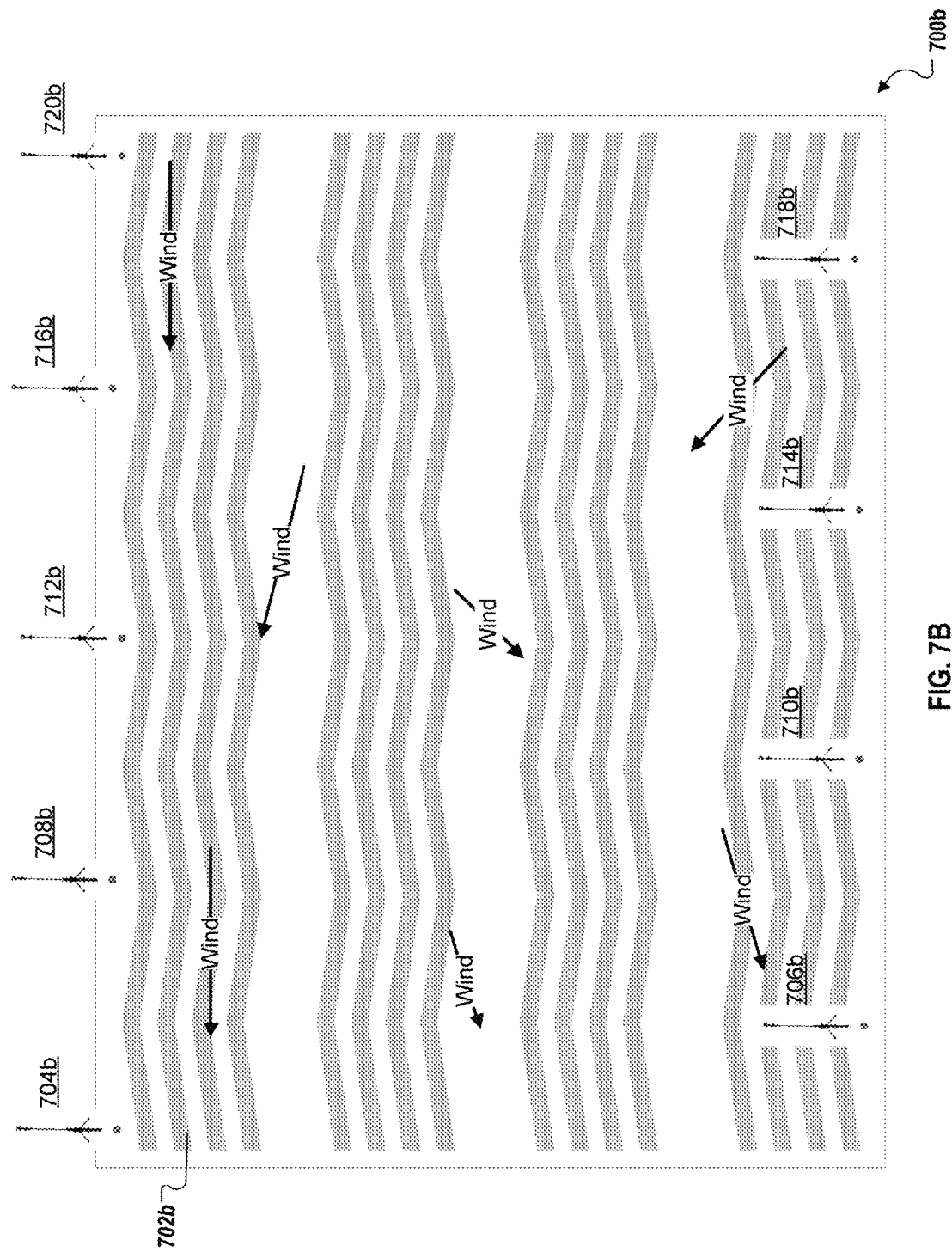

FIGS. 7A-7B illustrate additional applications 700a-700b of NAS 100 technology.

FIG. 7A illustrates an example wind turbine farm NAS 100 implementation 700a. ASP 150 units 704a-714a are arranged in a staggered pattern within wind turbines 702a. In typical operation, wind turbine rotor blades adjust reactively depending upon wind conditions detected at a wind turbine rotor assembly. In an implementation of a NAS 100, the associated ASP units 704a-714a can analyze wind as if flows between the wind turbines 702a and provide wind profile data. Using the provided wind profile data, wind turbines 702a can proactively adjust rotor blades based upon detected approaching winds to most efficiently use the profiled wind. In another implementation, wind turbines 702a behind other wind turbines 702a can leverage analyzed winds as a result of wind turbine turbulence and adjust accordingly. In some implementations, multiple NAS 100 systems can be coupled to the control system for one or more wind turbines to provide information, either individually or cooperatively, regarding approaching wind to proactively adjust one or more wind turbines. The coupling can be wired, wireless, optical, or by other suitable method. It should be apparent to those of skill in the art that the illustrated ASP arrangement is only one of a myriad of possible arrangements and that the illustrated arrangement is not meant to be limiting in any way.

FIG. 7B illustrates an example field-of-crops NAS 100 implementation 700b. ASP units 704b-720b are distributed in a cross-field staggered configuration to allow analysis of both sides of a field-of-crops to help arrive at a wind profile for the entire field of crops 702b. In other implementations, the ASP units could be distributed in any suitable arrangement/pattern. Winds over the field-of-crops affect, for example, pollen transfer, pesticide/fertilizer distribution, pest dispersion, irrigation water dispersion, humidity conditions, and the like. In the illustration, a NAS 100 system(s) is be placed in the field-of-crops and used to calculate a wind profile. Knowing the profile of winds over the field of crops can permit more accurate fertilizer and pesticide dispersion, more efficient irrigation, predictive pollination studies, and the like. In other implementations, the same principles could be applied to golf courses, large lawns, and predictive dispersal of pollution, toxic chemicals, bio-agents, and/or radiation plumes from nuclear accidents.

In another similar implementation (not illustrated), the NAS 100 technology could be used to determine winds ahead of a water-going vessel to better adjust sails and/or be prepared for wind changes. For example, ASP 150 units can be installed on navigational buoys to provide wind profile data. Similarly, ASP 150 units could be suspended aloft by balloons (also not illustrated) to provide wind profile data for aircraft. It should be apparent to those of skill in art that the illustrated/described field-of-crops ASP arrangement is only one representative example of a myriad of possible distributions and that the illustrated example distribution is not meant to be limiting in any way.

Figure 8:
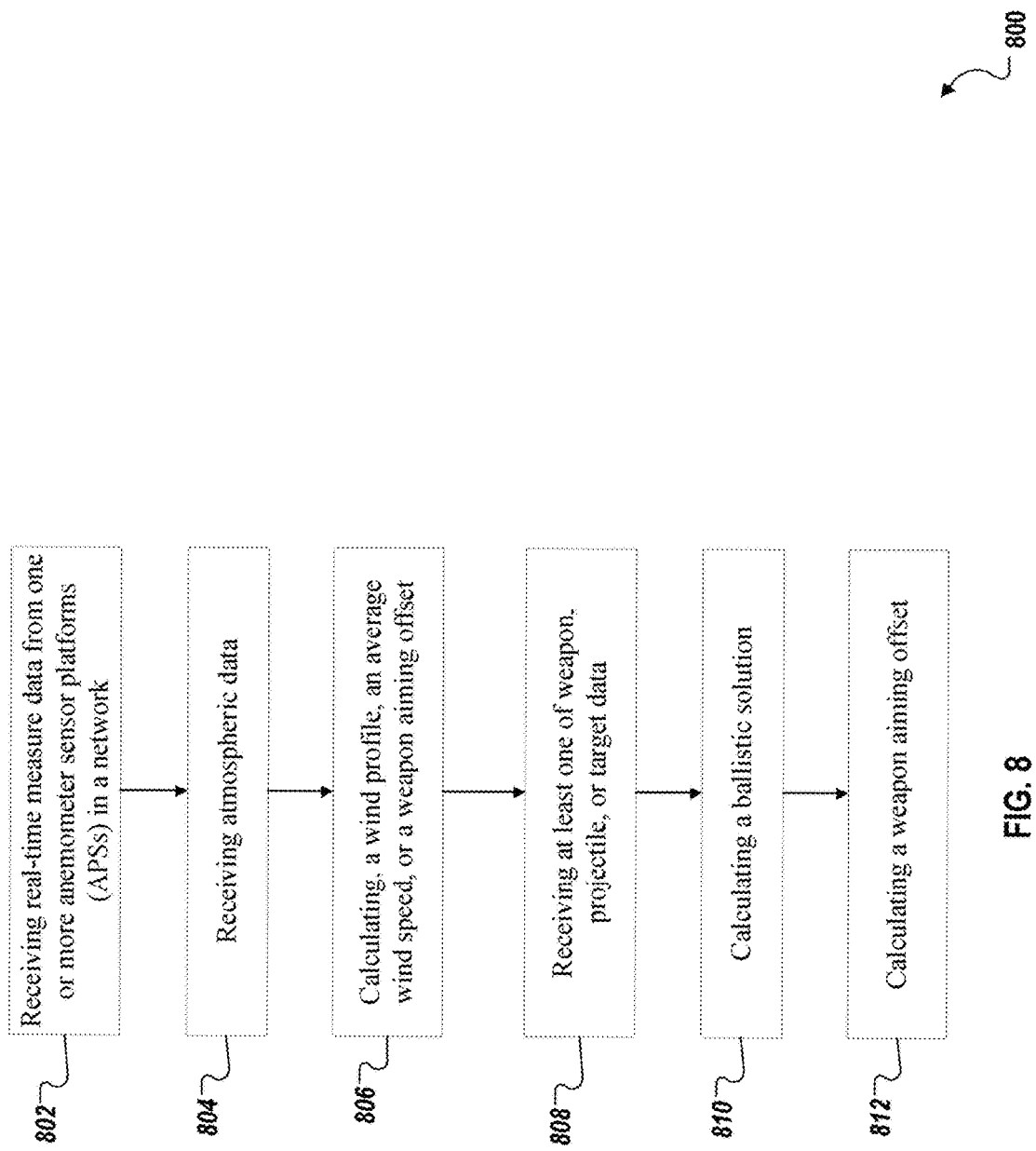
FIG. 8 is a flow chart of an example method for measuring wind according to an implementation.

FIG. 8 is a flow chart of an example method 800 for measuring a wind according to an implementation. For clarity of presentation, the description that follows generally describes method 800 in the context of FIGS. 1-5, 6A-6G, and 7A-7B. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, or in any order.

At 802, real-time wind measurement data from each of one or more anemometer sensor platforms (ASPs) in a network is received. From 802, method 800 proceeds to 804.

At 804, atmospheric data is received. In some implementations, the atmospheric data can be received from a source external to the ASPs, for example a portable weather station or other source. From 804, method 800 proceeds to 806.

At 806, using the received real-time wind measurement data and the received atmospheric data, calculating at least one of real-time wind measurements, a wind profile, an average wind speed, or a weapon aiming offset. From 806, method 800 proceeds to 808.

At 808, at least one of weapon, projectile, or target data is received. From 808, method 800 proceeds to 810.

At 810, a ballistic solution for a projectile is calculated by operation of a computer and using the received real-time wind measurement data, the received atmospheric data, and at least one of the received weapon, projectile, or target data. From 810, method 800 proceeds to 812.

At 812, a weapon aiming offset is calculated by operation of the computer and using the calculated ballistic solution. From 812, method 800 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data base station, or that includes a middleware component, e.g., an application base station, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and base stations. A client and base station are generally remote from each other and typically interact through a communication network. The relationship of client and base station arises by virtue of computer programs running on the respective computers and having a client-base station relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. Accordingly, the above description of example implementations does not define or constrain this disclosure. Other changes, substitutions, and alterations are also possible without departing from the spirit and scope of this disclosure.

What is claimed is:

1. A wind measurement system, comprising:
a base station adapted to receive real-time wind measurement data;
a network interface communicably coupled to the base station and adapted to provide a network connection to the base station; and
a mobile, wind-measurement anemometer sensor platform (ASP) configured to provide the real-time wind measurement data to the base station, wherein the ASP is configured to self-insert within and to automatically form a geographically-ordered ASP network with other geographically-local ASP peers to permit ASP-to-ASP communications over the ASP network, wherein the ASP network seeks a network connection to the base station through the network interface, and wherein an ASP order for the ASP in the ASP network is determined by a geographic location of the base station provided by the base station once connected to the ASP network.

2. The system of claim 1, wherein the base station comprises a portable weather station configured to provide at least one of temperature data, pressure data, or humidity data to the base station.

3. The system of claim 1, wherein the base station is configured to provide at least one of real-time wind measurements, a wind profile, an average wind speed, or a weapon aiming offset.

4. The system of claim 1, wherein the base station comprises a wind calculator application (WCA).

5. The system of claim 4, wherein the WCA is configured to initiate a display of at least one of the real-time wind measurements, the wind profile, the average wind speed, or the weapon aiming offset.

6. The system of claim 1, wherein the base station comprises a ballistic solver application (BSA).

7. The system of claim 6, wherein the BSA is configured to calculate a ballistic solution for a projectile using at least the real-time wind measurement data.

8. The system of claim 7, wherein the BSA is configured to calculate a weapon aiming offset using the ballistic solution.

9. The system of claim 1, wherein the base station comprises functionality to provide a replay functionality of at least one of logged received real-time wind measurement data or user actions.

10. The system of claim 1, wherein each ASP is configured to provide at least one of microphone data, camera data, or global positioning system (GPS) device data.

11. A wind measuring method, comprising:
receiving real-time wind measurement data at a base station network interface from a geographically-ordered anemometer sensor platform (ASP) network comprising a plurality of mobile, wind-measurement ASPs, wherein each ASP is configured to self-insert within and to automatically form the ASP network with other geographically-local ASP peers to permit ASP-to-ASP communications over the ASP network, wherein the ASP network seeks a network connection to the base station through the network interface, and wherein an ASP order for a particular ASP in the ASP network is determined by a geographic location of the base station provided by the base station once connected to the ASP network;
receiving atmospheric data; and
calculating, using the received real-time wind measurement data and the received atmospheric data, at least one of real-time wind measurements, a wind profile, an average wind speed, or a weapon aiming offset.

12. The method of claim 11, wherein the atmospheric data is received in real-time from an external data source.

13. The method of claim 11, comprising providing a replay functionality of at least one of logged received real-time wind measurement data or user actions.

14. The method of claim 11, comprising receiving at least one of weapon data, projectile data, or target data.

15. The method of claim 14, comprising calculating a ballistic solution for a projectile using the received real-time wind measurement data, the received atmospheric data, and at least one of the received weapon data, projectile data, or target data.

16. The method of claim 15, comprising calculating a weapon aiming offset using the calculated ballistic solution.

17. The method of claim 16, comprising initiating a display of the calculated weapon aiming offset in a graphical user interface.

18. The method of claim 11, comprising receiving at least one of microphone data, camera data, or global positioning system (GPS) device data from the ASP or other data source.

* * * * *

UNITED STATES PATENT AND TRADEMARK OFFICE
CERTIFICATE OF CORRECTION

PATENT NO. : 9,909,840 B2  
APPLICATION NO. : 13/870859  
DATED : March 6, 2018  
INVENTOR(S) : Leo Volfson Page 1 of 1

It is certified that error appears in the above-identified patent and that said Letters Patent is hereby corrected as shown below:

| Column | Line No. | Description of Error and Correction Needed |
|---|---|---|
| On the Title Page | | |
| Column 1, Item (54) Title | 1 | Delete "WINDMEASUREMENT" and insert -- WIND MEASUREMENT --, therefor. |
| In the Specification | | |
| Column 1, | 59 | Delete "wind-measurement" and insert -- wind measurement --, therefor. |

Signed and Sealed this  
Third Day of July, 2018

Andrei Iancu  
*Director of the United States Patent and Trademark Office*